US010567560B2

(12) United States Patent
Zhang et al.

(10) Patent No.: US 10,567,560 B2
(45) Date of Patent: Feb. 18, 2020

(54) MOBILE TERMINAL, HOUSING COMPONENT, AND MANUFACTURING METHOD THEREOF

(71) Applicant: Guangdong Oppo Mobile Telecommunications Corp., Ltd., Dongguan (CN)

(72) Inventors: Tao Zhang, Dongguan (CN); Wenfeng Sun, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/684,958

(22) Filed: Aug. 24, 2017

(65) Prior Publication Data

US 2018/0063303 A1 Mar. 1, 2018

(30) Foreign Application Priority Data

Aug. 25, 2016 (CN) .......................... 2016 1 0727663
Aug. 25, 2016 (CN) ...................... 2016 2 0945032 U (51) Int. Cl.
*H04M 1/00* (2006.01)
*H04M 1/02* (2006.01)
*H01Q 1/24* (2006.01)

(52) U.S. Cl.
CPC .......... *H04M 1/0249* (2013.01); *H01Q 1/243* (2013.01); *H04M 1/0202* (2013.01); *H04M 1/026* (2013.01)

(58) Field of Classification Search
CPC .... H01Q 1/243; H04M 1/0202; H04M 1/026; H04M 1/0249; B29C 45/14

USPC ....................................................... 455/575.1
See application file for complete search history.

(56) References Cited

U.S. PATENT DOCUMENTS

| 9,722,301 | B2* | 8/2017 | Kim | .................... H05K 5/0217 |
| 2002/0022405 | A1* | 2/2002 | Jung | ....................... G11C 5/04 |
| | | | | 439/625 |
| 2007/0049068 | A1 | 3/2007 | Yanagida | |
| 2012/0133560 | A1 | 5/2012 | Tang | |
| 2014/0125528 | A1* | 5/2014 | Tsai | ..................... H01Q 13/106 |
| | | | | 343/702 |
| 2016/0056527 | A1* | 2/2016 | Pascolini | ........... G06K 9/00006 |
| | | | | 343/702 |
| 2016/0226133 | A1 | 8/2016 | Jung et al. | |

(Continued)

FOREIGN PATENT DOCUMENTS

| CN | 204704663 | 10/2015 |
| CN | 205081814 | 3/2016 |

(Continued)

*Primary Examiner* — Edward F Urban
*Assistant Examiner* — Max Mathew
(74) *Attorney, Agent, or Firm* — Young Basile Hanlon & MacFarlane, P.C.

(57) ABSTRACT

A mobile terminal, a housing component and a manufacturing method thereof are provided. The housing component of the mobile terminal includes a conductive housing and a conductive rivet part. The conductive housing has a slot, the slot divides the conductive housing into a plurality of regions, and the slot is filled with an insulating layer. The conductive rivet part crosses over the slot, thereby electrically connecting the plurality of regions together. The conductive rivet part is riveted to the plurality of regions.

20 Claims, 5 Drawing Sheets

(56) References Cited

U.S. PATENT DOCUMENTS

| | | | |
|---|---|---|---|
| 2016/0254591 A1 | 9/2016 | Jung et al. | |
| 2016/0322758 A1* | 11/2016 | Wan | H01R 13/6583 |
| 2017/0084986 A1* | 3/2017 | Gang | H01Q 1/243 |
| 2017/0149120 A1* | 5/2017 | Zimmerman | H01Q 1/42 |
| 2017/0223852 A1 | 8/2017 | Gu et al. | |
| 2017/0338548 A1* | 11/2017 | Xiong | H04M 1/0277 |
| 2018/0124221 A1* | 5/2018 | Li | B32B 7/12 |
| 2019/0140158 A1* | 5/2019 | Eid | H01L 41/0533 |
| 2019/0269022 A1* | 8/2019 | Ryou | H05K 1/0281 |

FOREIGN PATENT DOCUMENTS

| | | |
|---|---|---|
| CN | 105789830 | 7/2016 |
| CN | 105846054 | 8/2016 |
| CN | 106332479 | 1/2017 |
| CN | 205993032 | 3/2017 |
| EP | 3038331 | 6/2016 |
| WO | WO 2015/074580 | 5/2015 |

* cited by examiner

MOBILE TERMINAL, HOUSING COMPONENT, AND MANUFACTURING METHOD THEREOF

RELATED APPLICATIONS

This application claims the benefit of priority of Chinese Patent Applications Nos. 201610727663.2 and 201620945032.3, both filed on Aug. 25, 2016. The contents of the above applications are all incorporated by reference as if fully set forth herein in their entirety.

FIELD AND BACKGROUND OF THE INVENTION

The present disclosure relates to a technical field of electronic apparatuses, and more specifically, the present disclosure relates to a mobile terminal, a housing component, and a manufacturing method thereof.

In related art, mid-frames of mobile terminals (e.g. cell phones) use an aluminum alloy material. In order to increase surface hardness and an appearance appeal, a product is anodized. In order to realize performance of antennas and aesthetics, the aluminum alloy is machined into a plurality of independent metal pieces. If the metal pieces are too narrow and have been oxidized, electrical conduction cannot be realized through a rack, and the aluminum alloy cannot be oxidized and colored.

DESCRIPTION OF THE SPECIFIC EMBODIMENTS OF THE INVENTION

Embodiments of the present disclosure are described in detail below and examples of the embodiments are illustrated in the accompanying drawings. The description of the embodiments with reference to the accompanying drawings below is exemplary, aims at illustrating the present disclosure, and cannot be considered as limitations to the present disclosure.

In the description of the present disclosure, it is to be appreciated that orientation or location relationships indicated by terms such as "length", "width", "thickness", "upper", "lower", "front", "back", "left", "right", "vertical", "horizontal", "top", "bottom", "inner" and "outer" are based on orientation or location relationships illustrated in the accompanying drawings. The terms are only used to facilitate the description of the present disclosure and to simplify the description, not used to indicate or imply the relevant device or element must have a particular orientation and must be structured and operate under the particular orientation and therefore cannot be considered as limitations to the present disclosure.

In addition, the terms "first" and "second" are only used for description purpose, and cannot be considered as indicating or implying relative importance or implicitly pointing out the number of relevant technical features. Thus, features being correspondingly defined as "first" and "second" may each expressly or implicitly include at least one of the features. In the description of the present disclosure, a meaning of "a plurality of" is at least two, such as two and three, unless otherwise definitely and specifically defined.

In the present disclosure, unless otherwise definitely specified and defined, the terms "install", "connected", "connection", "fixed" and so on should be considered broadly, for example, as a fixed connection, also as a detachable connection, and as an integral connection; for example, as a mechanical connection, also as an electrical connection, and as a connection for communicating with each other; for example, as being directly connected, also as being indirectly connected through an intervening medium; for example, as an internal connection between two elements, and as an operational relationship between two elements. To persons of ordinary skill in the art, the specific meanings of the aforementioned terms in the present disclosure may be appreciated based on corresponding specific situations.

With reference to FIG. 1 to FIG. 6, a housing component 100 of a mobile terminal 200 (FIG. 6), in accordance with an embodiment of the present disclosure, is described in detail below. It is to be noted that the mobile terminal 200 may be a cell phone, a tablet computer, or a laptop computer. The housing component 100 may be applied to the mobile terminal 200 to protect internal components of the mobile terminal 200.

Figure 1:
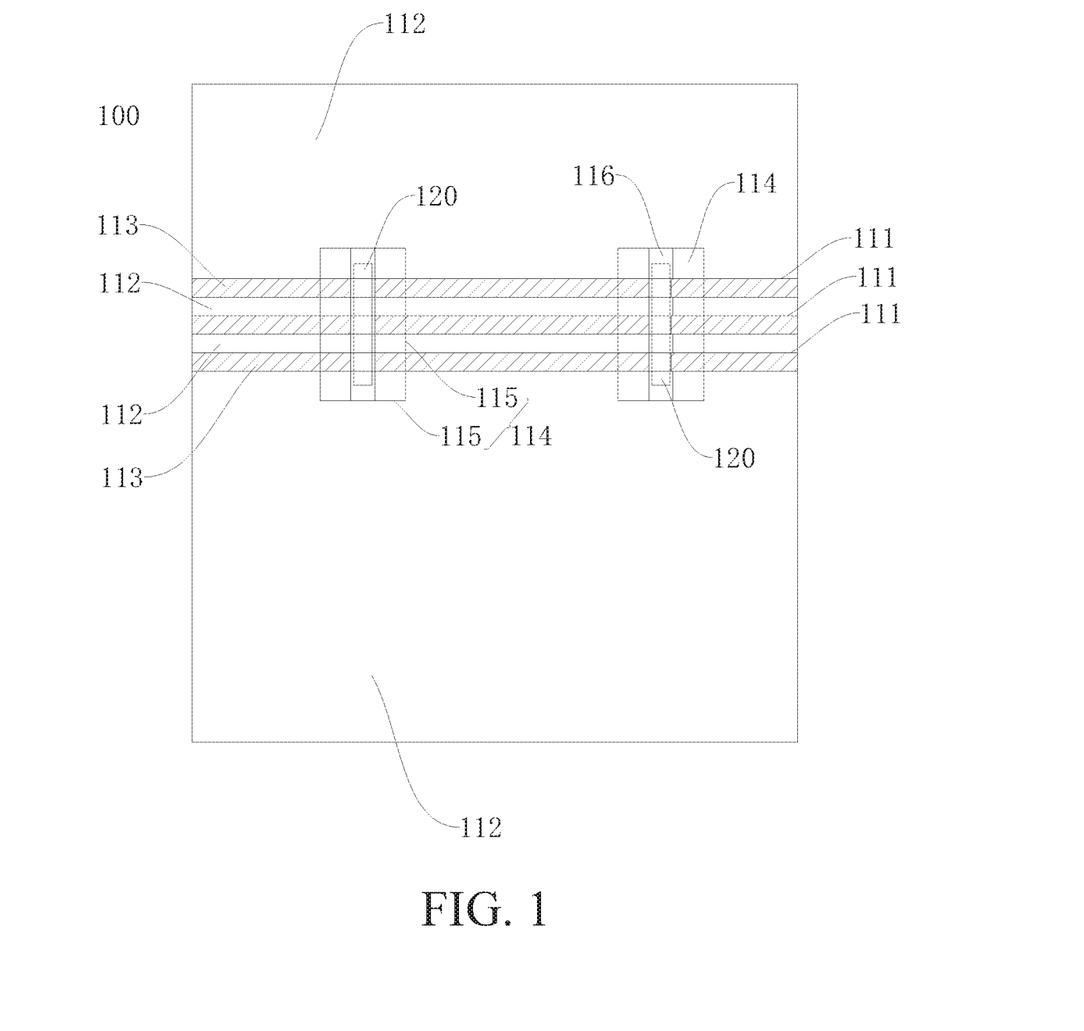
FIG. 1 is a schematic structural diagram of a housing component of a mobile terminal in accordance with an embodiment of the present disclosure.
Figure 2:
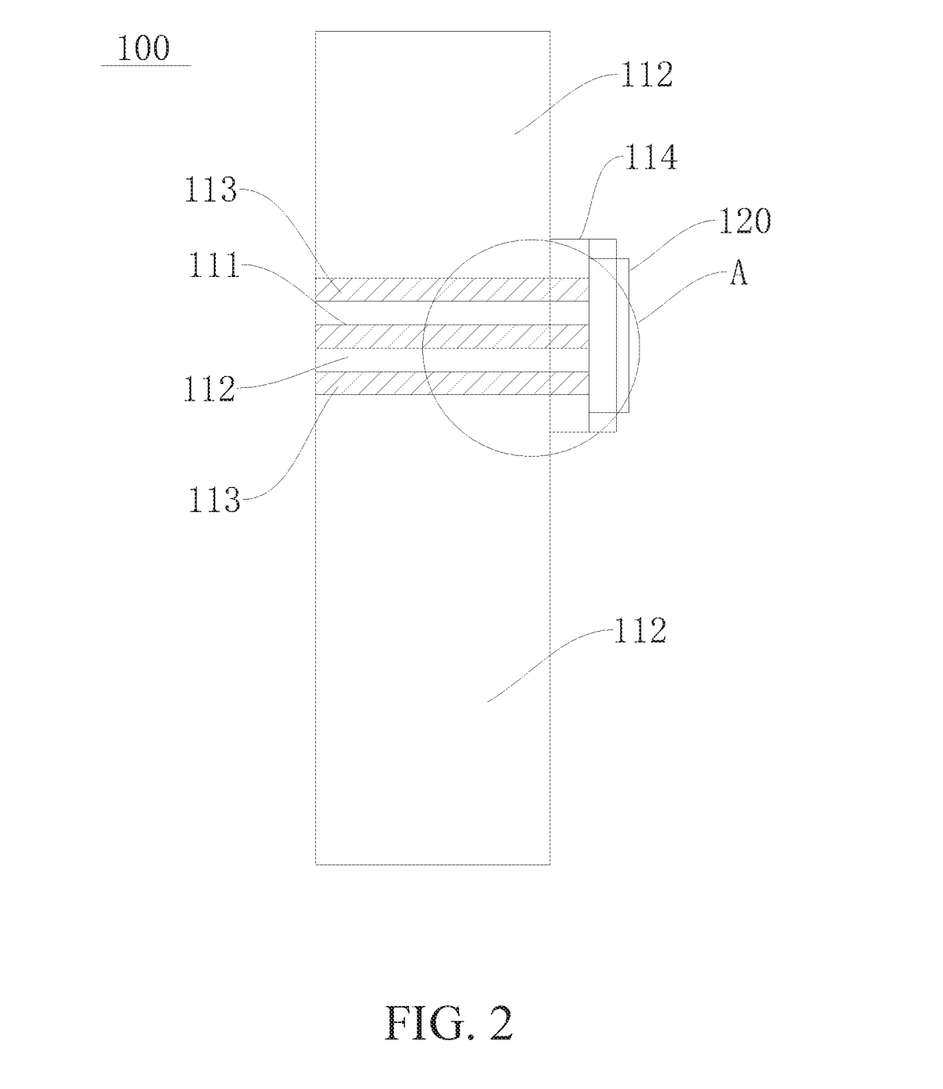
FIG. 2 is a schematic structural diagram of a housing component of a mobile terminal in accordance with an embodiment of the present disclosure.

As illustrated in FIGS. 1 to 6, the housing component 100 of the mobile terminal 200, in accordance with an embodiment of the present disclosure, includes a conductive housing 110 and a conductive rivet part 120. Specifically, the conductive housing 110 has a slot 111. The slot 111 divides the conductive housing 110 into a plurality of regions 112. The slot 111 is filled with an insulating layer 113. The conductive rivet part 120 crosses over the slot 111, so as to electrically connect the plurality of regions 112 together. The conductive rivet part 120 is riveted to the plurality of regions 112. For example, as illustrated in FIG. 1 and FIG. 2, the slot 111 in the conductive housing 110 extends along a left-right direction as illustrated in FIG. 1. The slot 111 divides the conductive housing 110 into a plurality of regions 112. The plurality of regions 112 are alternately distributed along an up-down direction as illustrated in FIG. 1. The conductive rivet part 120 crosses along the up-down direction as illustrated in FIG. 1 over the slot 111, so as to electrically connect the plurality of regions 112 together.

It is to be noted that when the mobile terminal 200 has a communication function or a signal transmitting function, the conductive housing 110 may be considered as a part of an antenna. The insulating layer 113 between two of the plurality of regions 112 adjacent to each other, may be considered as a medium for transmitting a signal, thereby strengthening signal strength and stability of the mobile terminal 200. In related art, in order for a plurality of regions to be electrically connected together, computer numerical control (CNC) machining is adopted. During the machining, some material is reserved to realize electrical connection between the plurality of regions. Such machining method has a long process cycle, complicated process procedures, and may result in deformation of a slot during plastic injection molding because of the reservation of the some material during the machining process.

The housing component 100 of the mobile terminal 200, in accordance with the embodiment of the present disclosure, realizes grounding and conduction of an antenna through electrically connecting the plurality of regions 112 of the conductive housing 110 using the conductive rivet part 120. Meanwhile, CNC machining cycles may be also shortened and deformation by plastic injection molding resulting from material reservation may be reduced.

Figure 4:
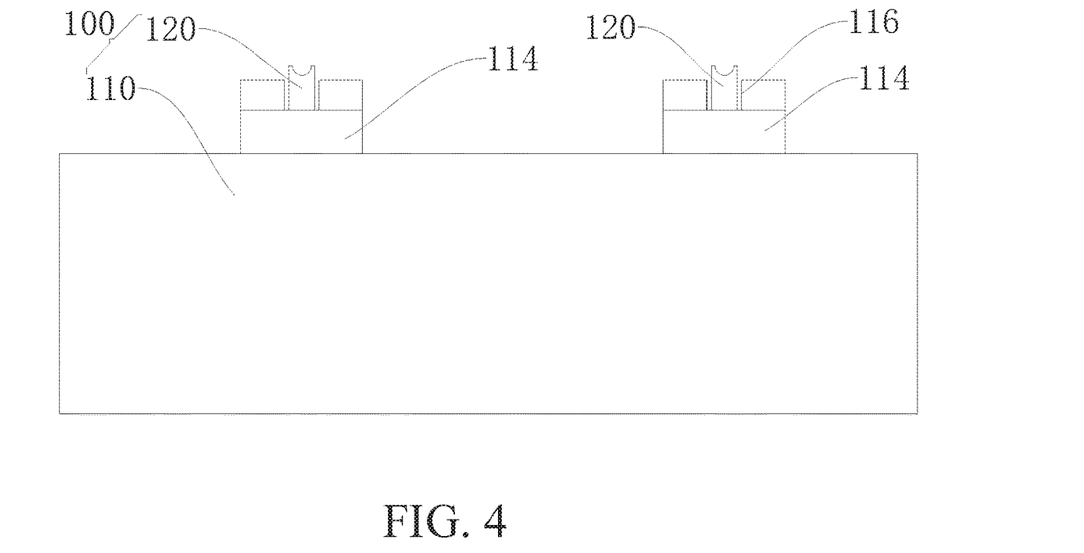
FIG. 4 is a schematic structural diagram of a housing component of a mobile terminal in accordance with an embodiment of the present disclosure, wherein a conductive rivet part is placed on a boss, and the conductive rivet part is not riveted to the boss.
Figure 5:
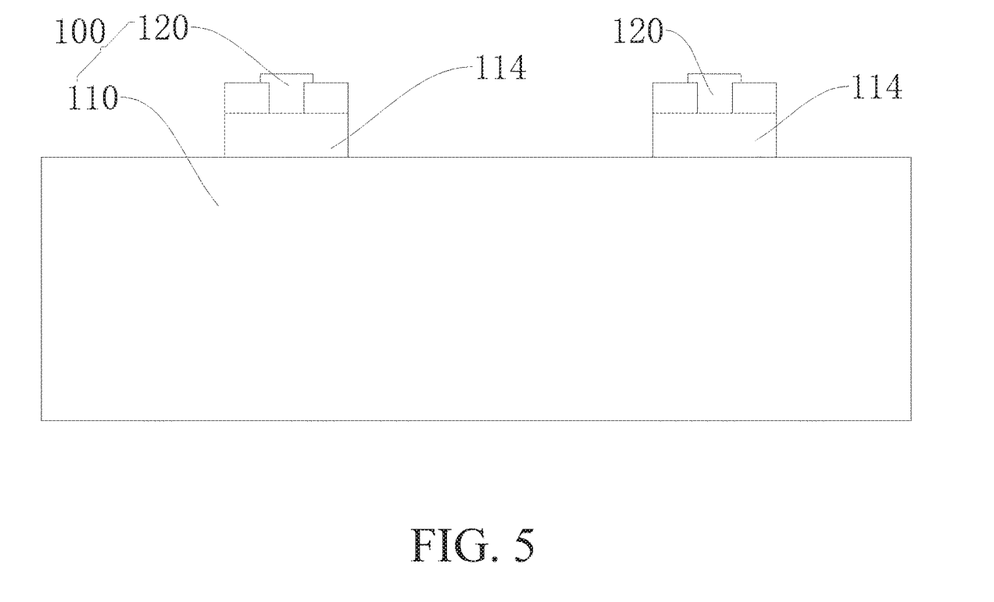
FIG. 5 is a schematic structural diagram of a housing component of a mobile terminal in accordance with an embodiment of the present disclosure, wherein a conductive rivet part is placed on a boss, and the conductive rivet part is riveted to the boss.

In accordance with an embodiment of the present disclosure, there are a plurality of conductive rivet parts 120, and the plurality of conductive rivet parts 120 are alternately distributed along a length direction of the slot 111. Thus, stability of a connection between the plurality of regions 112 may be reinforced. For example, as illustrated in FIG. 1, FIG. 4 and FIG. 5, the slot 111 extends along the left-right direction as illustrated in FIG. 1. The conductive rivet part 120 crosses along the up-down direction as illustrated in FIG. 1 over the slot 111, so as to electrically connect the plurality of regions 112 alternately distributed together. The plurality of conductive rivet parts 120 are alternately distributed along the left-right direction as illustrated in FIG. 1, FIG. 4 and FIG. 5, thereby connecting the plurality of regions 112 together.

In accordance with an embodiment of the present disclosure, as illustrated in FIG. 1 to FIG. 5, the conductive housing 110 has a boss 114, the slot 111 divides the boss 114 into a plurality of sub-bosses 115, and the conductive rivet part 120 is riveted to the plurality of sub-bosses 115. That is, in order to facilitate connecting the plurality of regions 112 together, a surface of the conductive housing 110 has the boss 114, the slot 111 divides the boss 114 into a plurality of sub-bosses 115, and the conductive rivet part 120 is riveted to the plurality of sub-bosses 115. Therefore, connection stability of the conductive rivet part 120 and the conductive housing 110 is reinforced, and stability of an antenna is further enhanced. In order to facilitate riveting the conductive rivet part 120 to the boss 114, in one embodiment of the present disclosure, the boss 114 is configured with a plurality of embedded grooves 116, and the conductive rivet part 120 is embedded into the plurality of embedded grooves 116. Further, the conductive rivet part 120 is first placed in the plurality of embedded grooves 116 of the boss 114 and is then riveted to the boss 114.

Figure 3:
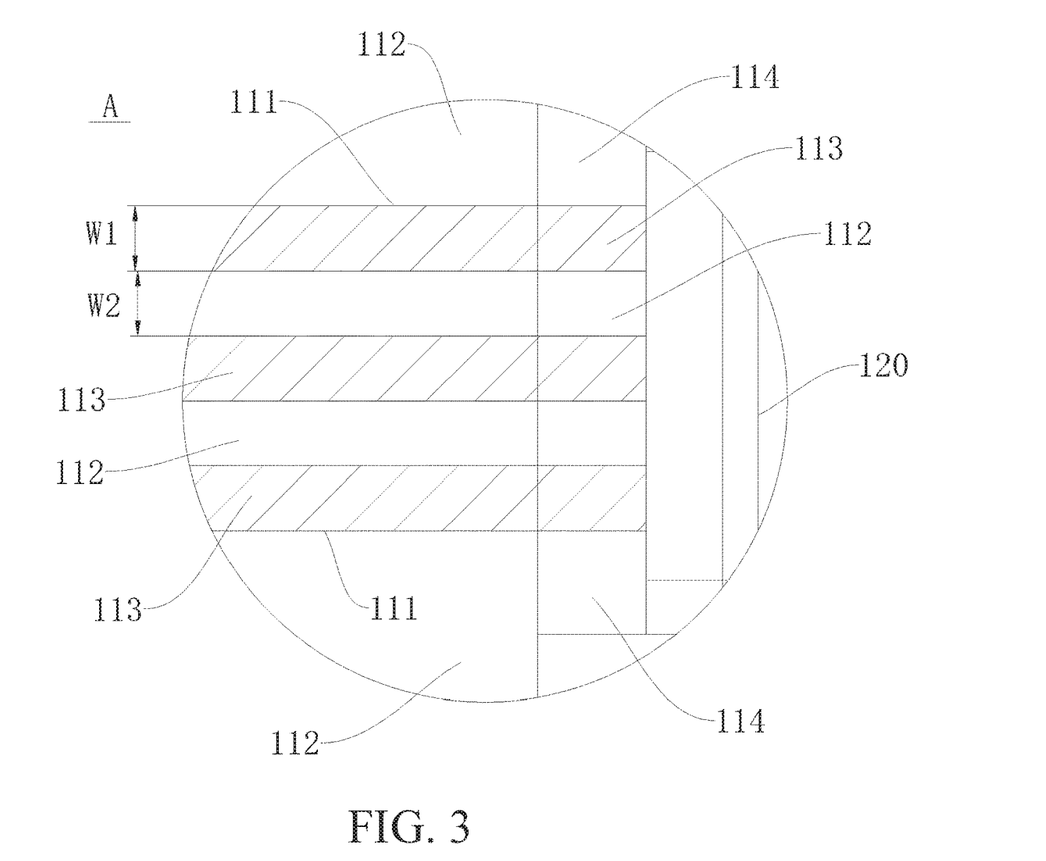
FIG. 3 is a schematic partially enlarged diagram of a portion A in FIG. 2.

In accordance with an embodiment of the present disclosure, the conductive rivet part 120 is an aluminum alloy part. The insulating layer 113 is a plastic insulating layer. In accordance with an embodiment of the present disclosure, as illustrated in FIG. 3, a width of the slot 111 is W1. That is, a width of the slot 111 along an up-down direction as illustrated in FIG. 2 is W1. W1 satisfies 0.3 mm≤W1≤0.5 mm. After being experimentally verified, when the width of the slot 111 is 0.3 mm≤W1≤0.5 mm, signal strength and stability of the mobile terminal 200 are strengthened. In accordance with an embodiment of the present disclosure, as illustrated in FIG. 1 to FIG. 3, there are a plurality of slots 111, and the plurality of slots 111 are spaced apart from each other. Spacing between adjacent two of the plurality of slots 111 is W2. That is, a distance between adjacent two of the plurality of slots 111 along the up-down direction as illustrated in FIG. 2 is W2. W2 satisfies 0.3 mm≤W2≤1 mm. In accordance with an embodiment of the present disclosure, there is at least one slot 111, and the number of the at least one slot 111 is N, where N satisfies 1≤N≤3.

With reference to FIG. 1 to FIG. 6, a housing component 100 of a mobile terminal 200, in accordance with an embodiment of the present disclosure, is described in detail below. It is worth appreciated that the description below is only exemplary and does not specifically limits the present disclosure. It is to be noted that the mobile terminal 200 may be a cell phone, a tablet computer, or a laptop computer. The housing component 100 may be applied to the mobile terminal 200 to protect internal components of the mobile terminal 200. To facilitate description, a housing component of a cell phone is used as an example for the housing component 100.

As illustrated in FIG. 1 to FIG. 3, the housing component 100 of the cell phone includes a conductive housing 110 and two conductive rivet parts 120. The conductive housing 110 and the two conductive rivet parts 120 are both aluminum alloy parts made of aluminum alloy.

Specifically, the conductive housing 110 has three slots 111. The three slots 111 divide the conductive housing 110 into four regions 112. Each of the three slots 111 is filled with a corresponding insulating layer 113. The two conductive rivet parts 120 cross over the three slots 111, so as to electrically connect the four regions 112 together. As illustrated in FIG. 1, the three slots 111 extend along a left-right direction as illustrated in FIG. 1. The four regions 112 are alternately distributed along an up-down direction as illustrated in FIG. 1. As illustrated in FIG. 2, a width of each of the three slots 111 along an up-down direction as illustrated in FIG. 2 is W1. W1 satisfies 0.3 mm≤W1≤0.5 mm. A distance between adjacent two of the three slots 111 along the up-down direction as illustrated in FIG. 2 is W2. W2 satisfies 0.3 mm≤W2≤1 mm.

As illustrated in FIG. 1 to FIG. 3, the two conductive rivet parts 120 cross along the up-down direction as illustrated in FIG. 1 over the three slots 111 to be riveted to the four regions 112, which causes the four regions 112 to be electrically connected through the two conductive rivet parts 120. Thus, an antenna is grounded and conducted through electrically connecting the four regions 112 of the conductive housing 110 using the two conductive rivet parts 120. Meanwhile, CNC machining cycles may be also shortened and deformation by plastic injection molding resulting from material reservation may be reduced.

Figure 6:
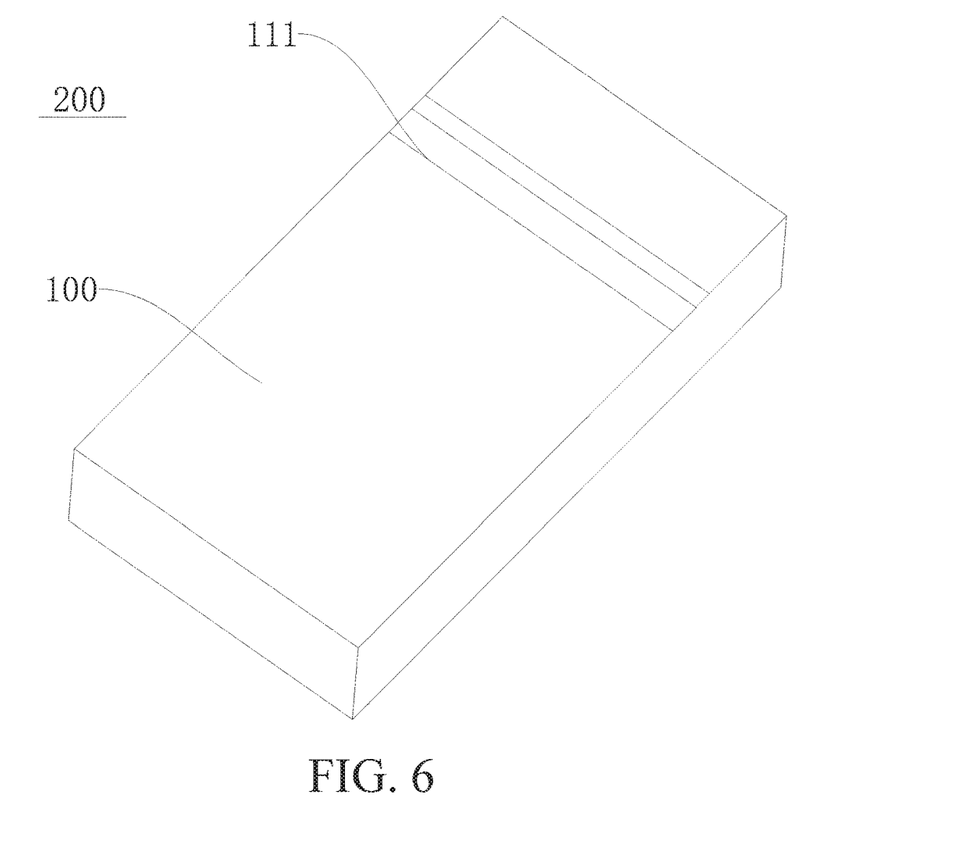
FIG. 6 is a schematic structural diagram of a mobile terminal in accordance with an embodiment of the present disclosure.

As illustrated in FIG. 6, a mobile terminal 200, in accordance with an embodiment of the present disclosure, includes the aforementioned housing component 100 of the mobile terminal 200.

The mobile terminal 200, in accordance with the embodiment of the present disclosure, realizes grounding and conduction of an antenna through electrically connecting the plurality of regions 112 of the conductive housing 110 using the conductive rivet part 120. Meanwhile, CNC machining cycles may be also shortened and deformation by plastic injection molding resulting from material reservation may be reduced.

Figure 7:
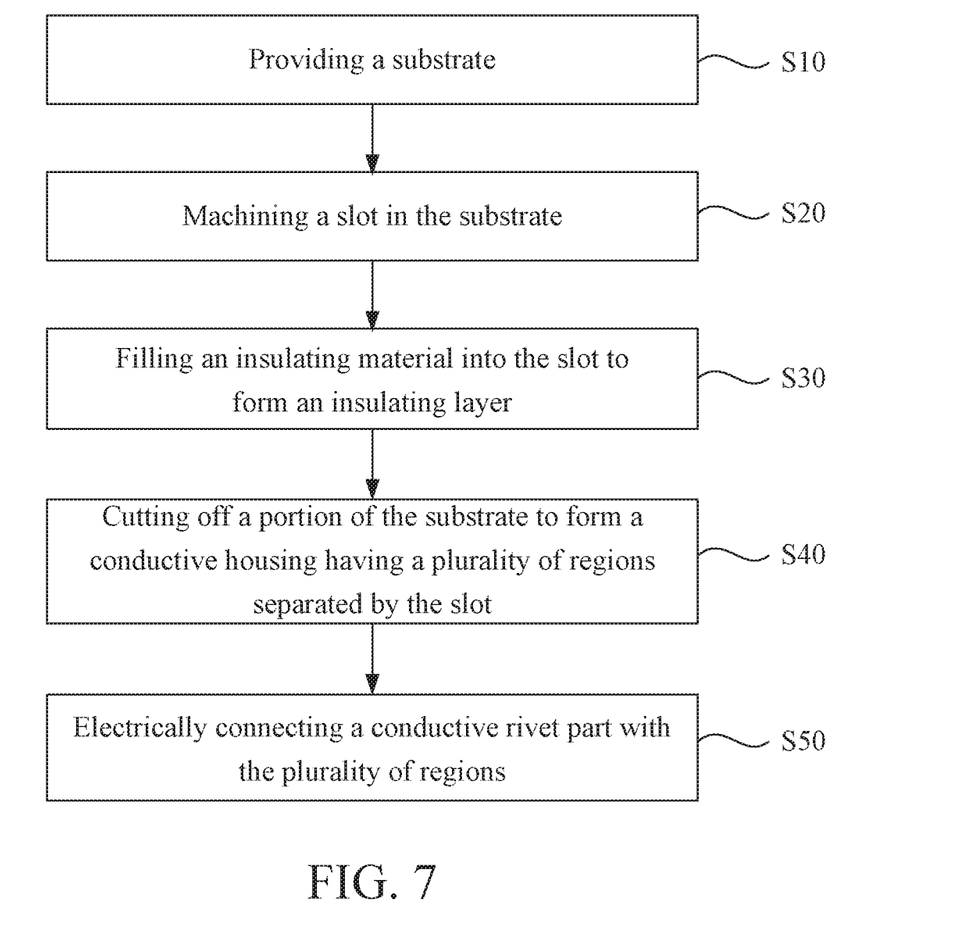
FIG. 7 is a flowchart of a manufacturing method of a housing component of a mobile terminal in accordance with an embodiment of the present disclosure.

As illustrated in FIG. 7, a manufacturing method of a housing component 100 of a mobile terminal 200, in accordance with an embodiment of the present disclosure, is provided. The housing component 100 is the aforementioned housing component 100 of the mobile terminal 200. The manufacturing method includes the following operations:

S10: A substrate is provided.

S20: The slot 111 in the substrate is machined.

S30: An insulating material is filled into the slot 111 to form the insulating layer 113.

S40: A portion of the substrate is cut off to form the conductive housing 110 having the plurality of regions 112.

S50: The conductive rivet part 120 is riveted to the conductive housing 110 so that the conductive rivet part 120 is electrically connected with the plurality of regions 112. Specifically, the conductive rivet part 120 may first as illustrated in FIG. 4 be placed on the conductive housing 110, and then as illustrated in FIG. 5 be riveted to the conductive housing 110.

The manufacturing method of the housing component 100 of the mobile terminal 200, in accordance with the embodiment of the present disclosure, realizes grounding and conduction of an antenna through electrically connecting the plurality of regions 112 of the conductive housing 110 using the conductive rivet part 120. Meanwhile, CNC machining cycles may be also shortened and deformation by plastic injection molding resulting from material reservation may be reduced.

In the description of the present disclosure, terms such as "an embodiment", "some embodiments", "an example", "a specific example", and "some examples" referred to in the description mean at least one embodiment or example of the present disclosure includes a specific feature, structure, material or characteristic described in combination with an embodiment or example. In the present disclosure, an illustrative expression of the aforementioned terms does not need to be focused on the same embodiment or example. Further, the specific feature, structure, material or characteristic described may be adequately combined in any of or a plurality of embodiments and examples. In addition, in a situation where conflicts between each other do not exist, persons skilled in the art may combine and group different embodiments and examples with features of different embodiments and examples described in the present disclosure.

Although the embodiments of the present disclosure have been illustrated and described above, it is to be appreciated that the foregoing embodiments are illustrative and cannot be considered as limitations to the present disclosure. Persons skilled in the art may change, modify, replace and vary the foregoing embodiments within the scope of the present disclosure.

What is claimed is:

1. A housing component of a mobile terminal, comprising:
a conductive housing, wherein the conductive housing has a plurality of slots, wherein the slots divide the conductive housing into a plurality of regions which are fully separated from each other, and each slot is filled with an insulating layer; and
a conductive rivet part, wherein the conductive rivet part crosses over the slots and electrically connect all of the plurality of regions together, to ground and conduct an antenna comprising the plurality of regions and the conductive rivet part, wherein the conductive rivet part is riveted to the plurality of regions.

2. The housing component of the mobile terminal of claim 1, wherein there are a plurality of conductive rivet parts, and the plurality of conductive rivet parts are alternately distributed along a length direction of the slots.

3. The housing component of the mobile terminal of claim 1, wherein the conductive housing has a boss, the slots divide the boss into a plurality of sub-bosses, and the conductive rivet part is riveted to the plurality of sub-bosses.

4. The housing component of the mobile terminal of claim 1, wherein a width of the slot is W1 and 0.3 mm≤W1≤0.5 mm.

5. The housing component of the mobile terminal of claim 1, wherein the number of the at least one slot is N, wherein 1<N≤3.

6. The housing component of the mobile terminal of claim 1, wherein the plurality of slots are spaced apart from each other, spacing between adjacent two of the plurality of slots is W2 and 0.3 mm≤W2≤1 mm.

7. The housing component of the mobile terminal of claim 1, wherein the conductive rivet part is an aluminum alloy part.

8. The housing component of the mobile terminal of claim 1, the insulating layer is a plastic insulating layer.

9. A mobile terminal, comprising:
a conductive housing, wherein the conductive housing has a plurality of slots, wherein the slots divide the conductive housing into a plurality of regions which are fully separated from each other, and each slot is filled with an insulating layer;
a conductive rivet part; and
an antenna comprising the plurality of regions and the conductive rivet part;
wherein the conductive rivet part crosses over the slots and electrically connect all of the plurality of regions together, to ground and conduct the antenna, wherein the conductive rivet part is riveted to the plurality of regions.

10. The mobile terminal of claim 9, wherein there are a plurality of conductive rivet parts, and the plurality of conductive rivet parts are alternately distributed along a length direction of the slots.

11. The mobile terminal of claim 9, wherein the conductive housing has a boss, the slots divide the boss into a plurality of sub-bosses, and the conductive rivet part is riveted to the plurality of sub-bosses.

12. The mobile terminal of claim 9, wherein a width of the slot is W1 and 0.3 mm≤W1≤0.5 mm.

13. The mobile terminal of claim 9, wherein there is at least one slot, and the number of the at least one slot is N, wherein 1<N≤3.

14. The mobile terminal of claim 9, wherein the plurality of slots are spaced apart from each other, spacing between adjacent two of the plurality of slots is W2 and 0.3 mm≤W2≤1 mm.

15. The mobile terminal of claim 9, wherein the conductive rivet part is an aluminum alloy part.

16. The mobile terminal of claim 9, the insulating layer is a plastic insulating layer.

17. A manufacturing method of a housing component, wherein the housing component comprises:
a conductive housing, wherein the conductive housing has a plurality of slots, wherein the slots divide the conductive housing into a plurality of regions which are fully separated from each other; and
a conductive rivet part, wherein the conductive rivet part crosses over the slots and electrically connect all of the plurality of regions together, to ground and conduct an antenna comprising the plurality of regions and the conductive rivet part;

wherein the manufacturing method comprises:
- providing a substrate;
- machining the plurality of slots in the substrate;
- filling an insulating material into each slot to form an insulating layer;
- cutting off a portion of the substrate to form the conductive housing having the plurality of regions;
- riveting the conductive rivet part to the plurality of regions to electrically connect the conductive rivet part with the plurality of regions.

18. The manufacturing method of claim 17, wherein there are a plurality of conductive rivet parts, and the plurality of conductive rivet parts are alternately distributed along a length direction of the slots.

19. The manufacturing method of claim 17, wherein the conductive housing has a boss, the slots divide the boss into a plurality of sub-bosses, and the conductive rivet part is riveted to the plurality of sub-bosses.

20. The manufacturing method of claim 17, wherein a width of the slot is W1 and $0.3 \text{ mm} \leq W1 \leq 0.5 \text{ mm}$.

* * * * *